(12) United States Patent
Keoshkerian et al.

(10) Patent No.: US 10,174,205 B2
(45) Date of Patent: Jan. 8, 2019

(54) PRINTING PROCESS

(71) Applicant: Xerox Corporation, Norwalk, CT (US)

(72) Inventors: Barkev Keoshkerian, Thornhill (CA); Carolyn Moorlag, Mississauga (CA); Edward G. Zwartz, Mississauga (CA); Naveen Chopra, Oakville (CA); Marcel P. Breton, Mississauga (CA); Sarah J. Vella, Milton (CA)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 14/886,909

(22) Filed: Oct. 19, 2015

(65) Prior Publication Data
US 2017/0106586 A1 Apr. 20, 2017

(51) Int. Cl.

| | |
|---|---|
| *B29C 67/00* | (2017.01) |
| *C09D 5/00* | (2006.01) |
| *C09D 4/00* | (2006.01) |
| *C08F 122/10* | (2006.01) |
| *C08F 222/10* | (2006.01) |
| *B29C 64/106* | (2017.01) |
| *B33Y 10/00* | (2015.01) |
| *B33Y 70/00* | (2015.01) |
| *B29K 105/00* | (2006.01) |

(52) U.S. Cl.
CPC .............. *C09D 4/00* (2013.01); *B29C 64/106* (2017.08); *C08F 122/105* (2013.01); *C08F 222/1006* (2013.01); *C09D 5/00* (2013.01); *B29K 2105/0002* (2013.01); *B29K 2105/0061* (2013.01); *B33Y 10/00* (2014.12); *B33Y 70/00* (2014.12); *Y02P 20/582* (2015.11)

(58) Field of Classification Search
CPC ........... C08F 222/1006; C08F 122/105; B29C 64/106; C09D 7/125; C09D 4/00; C09D 5/00; Y02P 20/582; B33Y 10/00; B33Y 70/00; B29K 2105/0061; B29K 2105/0002
See application file for complete search history.

(56) References Cited

U.S. PATENT DOCUMENTS

| | | | |
|---|---|---|---|
| 6,902,246 B2 * | 6/2005 | Varnon | B33Y 30/00 347/1 |
| 7,259,275 B2 | 8/2007 | Belelie et al. | |
| 8,142,557 B2 | 3/2012 | Belelie et al. | |
| (Continued) | | | |

OTHER PUBLICATIONS

Bo Wu, et al., U.S. Appl. No. 14/569,675, filed Dec. 13, 2014, "White Phase Change Ink Composition," not yet published.
(Continued)

*Primary Examiner* — Robert J Grun
(74) *Attorney, Agent, or Firm* — Marylou J. Lavoie, Esq. LLC

(57) ABSTRACT

A process including providing a curable gellant ink composition having a phase transition temperature; heating the ink composition to a temperature above the phase transition temperature; depositing the ink composition onto a substrate; wherein upon contact with the substrate the ink composition freezes to provide a gel ink layer; treating at least a portion of the gel ink layer whereby treated gellant ink reacts to form a three-dimensional object and wherein untreated gellant ink does not react and remains in gellant form; optionally, wherein the unreacted gellant ink provides a support structure for overhang portions of the three-dimensional object.

22 Claims, 4 Drawing Sheets

(56) References Cited

U.S. PATENT DOCUMENTS

| | | |
|---|---|---|
| 8,545,002 B2 | 10/2013 | Belelie et al. |
| 8,642,692 B1 | 2/2014 | Stockwell et al. |
| 8,882,256 B2 | 11/2014 | Chopra et al. |
| 8,916,084 B2 * | 12/2014 | Chretien .............. C09D 11/101 264/401 |
| 2010/0323102 A1 | 12/2010 | Chopra et al. |
| 2014/0167300 A1 * | 6/2014 | Lee ........................ A61K 6/083 264/17 |

OTHER PUBLICATIONS

Bo Wu, et al., U.S. Appl. No. 14/569,678, filed Dec. 13, 2014, "Water Dispersible Phase Change Ink Suitable for Use As a Photo-Mask," not yet published.

* cited by examiner

PRINTING PROCESS

BACKGROUND

Disclosed herein is a printing process. More particularly described is a three-dimensional printing process comprising selective laser lithography using curable gellant ink compositions.

Three-dimensional (3D) printing is fast becoming a major industry. Additive manufacturing processes can be used to prepare 3D objects. Additive manufacturing generally uses four main processes. These are stereolithography (SLA), selective laser sintering (SLS), fused deposition modeling (FDM), and multi-jet modeling (MJM). There are advantages and disadvantages to each process. One of the primary challenges in general is that three-dimensional (3D) objects require a support structure to handle 3D objects that require overhangs or unsupported structures prior to curing. SLS addresses this challenge by using the powder in the bed to be the support structure wherever it is required. A major disadvantage with this approach is the slightly powder surface appearance and the need for polishing to provide smooth surfaces, waste of the bed powder, and the requirement for post-build removal of the powder support structure.

SLA and MJM may be more desirable in terms of surface finish, but require support structures built into the overall build that must be removed post-build with baths to dissolve or facilitate washing away of the support. SLA is illustrated generally in FIG. 1. In an SLA process 10, the liquid monomer 12 is deposited into a bath or vat 14 in a small layer and then exposed to ultra-violet (UV) light via a UV laser 16 to cross-link the monomer. The build platform 18 having stereolithography pattern 20 thereon is then lowered such as via elevator 22 capable of Z-axis movement 24 until another layer is ready to be exposed. 26 indicates the resin surface. This process continues until the object is formed. In complex 3D objects where there are overhangs and the like, support materials are required to enable the overhangs. This requires a support material that is both cross-linkable but also removable, such as by solvent wash or physical means. These requirements present a major impediment to the SLA process.

In MJM processes, the liquid monomer is jetted onto a substrate layer by layer, interspersed with a curing step such as by exposure to ultra-violet light. Thus, the 3D object is built up over time. However, again with objects that have overhangs, a support layer that is jettable, curable, and removable after the object has been formed is required.

SLS is illustrated generally in FIG. 2. In an SLS process 200, the powder particles are deposited via a powder delivery system 210 including a powder delivery piston 212 and a roller 214 that is reversibly movable along the direction indicated by the area (and back) along the fabrication powder bed 216 in the build area and then selectively melted layer by layer. Laser 218 and scanner system 220 are directed toward the object being fabricated 222 on fabrication piston 224. Between each step, the new powder is rolled onto the object surface. An advantage to using SLS is that no separate support materials are required. In the area where there is no object, the particles are not sintered by the laser light. With overhangs of the 3D object, the unsintered powder acts as the support material. However, SLS processes present the disadvantages of a slower build speed than other 3D processes and, in most cases, the powder cannot be reused.

Currently available printing processes may be suitable for their intended purposes. However a need remains for improved printing processes. Further, a need remains for an improved three-dimensional printing process. Further, a need remains for an improved three-dimensional printing process which provides improved speed and reduced material waste over currently available processes. Further, a need remains for an improved three-dimensional printing process which overcomes the problems associated with the requirement of providing separate support materials and removing the separate support materials.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process including providing a curable gellant ink composition having a phase transition temperature; heating the ink composition to a temperature above the phase transition temperature; depositing the ink composition onto a substrate; wherein upon contact with the substrate the ink composition freezes to provide a gel ink layer; treating at least a portion of the gel ink layer whereby treated gellant ink reacts to form a three-dimensional object and wherein untreated gellant ink does not react and remains in gellant form; optionally, wherein the unreacted gellant ink provides a support structure for overhang portions of the three-dimensional object; and wherein the untreated gellant ink is re-useable.

Also described is a process comprising providing a curable gellant ink composition having a phase transition temperature; heating the ink composition to a temperature above the phase transition temperature; depositing the ink composition onto a substrate; wherein upon contact with the substrate the ink composition freezes to provide a gel ink layer; treating at least a portion of the gel ink layer whereby treated gellant ink reacts to form a three-dimensional object and wherein untreated gellant ink does not react and remains in gellant form and wherein the untreated gellant ink is re-useable; wherein the unreacted gellant ink provides a support structure for overhang portions of the three-dimensional object; and collecting the untreated gellant ink.

Also described is a process comprising providing at least one of a curable gellant ink composition having a phase transition temperature and a curable gellant having a phase transition temperature; heating to a temperature above the phase transition temperature of the curable gellant ink composition or heating to a temperature above the phase transition temperature of the curable gellant; depositing one or both the ink composition and the curable gellant onto a substrate; wherein upon contact with the substrate the ink composition, the curable gellant, or both, freeze to provide a gel ink layer, a gellant layer, or both a gel ink layer and a gellant layer; treating at least a portion of the gel ink layer, at least a portion of the gellant layer, or both, whereby treated gellant ink and treated gellant reacts to form a three-dimensional object and wherein untreated gellant ink and untreated gellant does not react and remains in gellant form and wherein the untreated gellant ink and untreated gellant is re-useable; wherein the unreacted gellant ink, the unreacted gellant, or both, provide a support structure for overhang portions of the three-dimensional object; and collecting the untreated gellant ink, the untreated gellant, or both.

DETAILED DESCRIPTION

In embodiments, a process is provided which harnesses the unique properties of curable gellant inks, in embodiments which harnesses the phase behavior characteristics of curable gellant inks, to essentially marry the attributes of selective laser sintering (SLS) and stereolithography (SLA) while reducing or eliminating altogether the disadvantages of these processes. Thus, in embodiments, the process herein comprises heating a curable gellant ink to a temperature above its phase transition temperature, wherein the ink can be easily jetted or spray deposited across the entire tank volume. Then, the process comprises cooling wherein the ink forms a solid-like gel. The process then comprises forming a three-dimensional (3D) object by inducing cross-linking; in embodiments, wherein inducing cross-linking comprises exposing the build area to radiation, in embodiments, ultra-violet radiation, to induce cross-linking. In the non-exposed areas, the gel structure is maintained. Thus, the 3D object is built up layer by layer. The process avoids the need for support materials since the gellant ink itself, in non-build areas, acts as the support. Once the 3D object is fully formed, the process comprises heating to a temperature above the ink phase transition temperature whereby the build material is simply melted away, and optionally, recovering the melted build material which can then be re-used.

Figure 1:
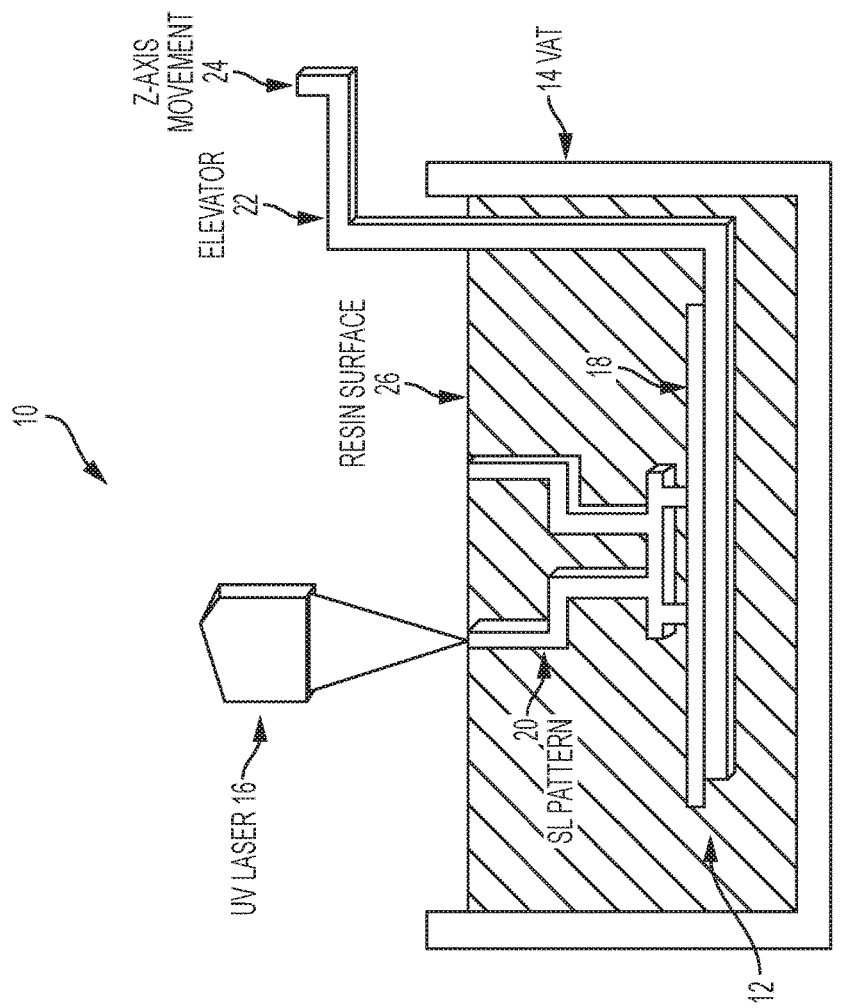
FIG. 1 is an illustration of stereolithography.
Figure 2:
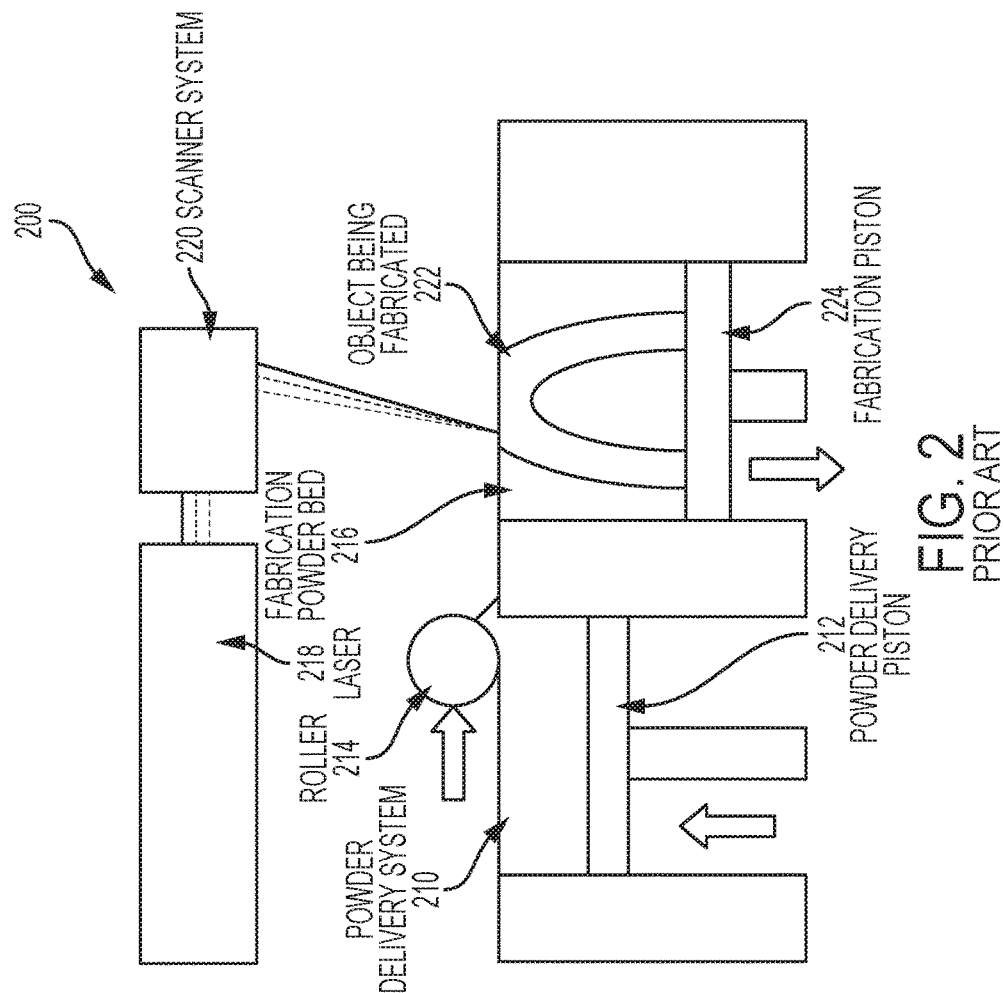
FIG. 2 is an illustration of selective laser sintering.
Figure 3:
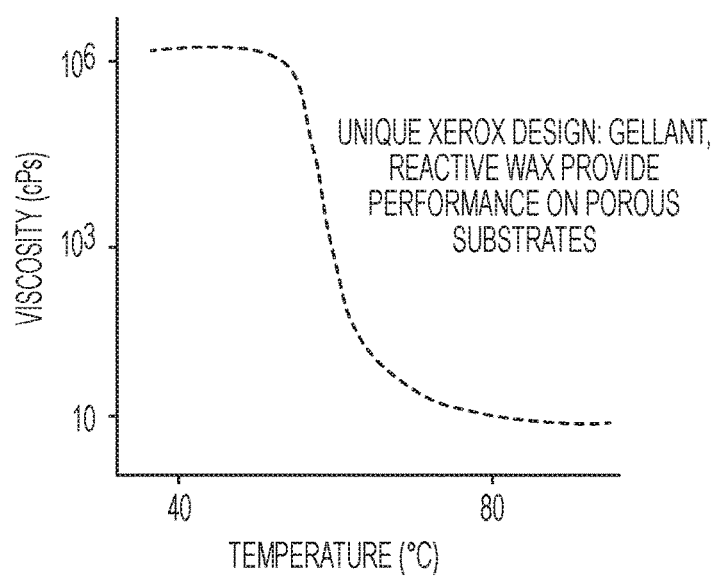
FIG. 3 is a graph showing viscosity (centipoise, y-axis) versus temperature (° C., x-axis) for an ultra-violet curable gellant ink in accordance with the present disclosure.

The processes herein utilize a curable gellant ink, in embodiments, an ultra-violet curable gellant ink, having the characteristic of being a solid at room temperature but jettable at elevated temperatures. The gel exhibits interesting rheological behavior as shown in FIG. 3. At a transition temperature, that is controllable by gel structure, the gel goes from $10^6$ centipoise down to less than 10 centipoise. Thus, one can formulate an ultra-violet ink that contains the gel material. The ultra-violet curable gellant ink further exhibits the same phase transition phenomenon. Thus, when an ink is jetted onto a substrate, it forms a gel layer, which is analogous to the powder bed layer of an SLS process. Upon irradiation, such as with ultra-violet light, the areas that are exposed cross link. The areas that are not exposed remain as a gel and can act as support for overhang areas. Once the whole 3D object is built, it can then be heated to a temperature above the phase transition temperature of the ink and the ink can be melted away to give the desire 3D object. Since the melted away ink was not exposed to irradiation, it can be easily re-used.

In embodiments, the process comprises a combined SLS/SLA type process whereby an ultra-violet curable gellant ink is heated above its phase transition temperature and can then be deposited layer by layer (such as by multi-jet or by spray coating techniques) and wherein, upon contact with the build substrate, the ink freezes to provide a gellant ink layer. This is then exposed to ultra-violet light to build the 3D object. The unexposed area remains as a gel and provides a support lattice for overhang parts of the 3D object. Furthermore, because the gel is a solid, thicker layers can be made prior to UV exposure, thus decreasing the build time for the 3D object.

In embodiments, a process herein includes providing a curable gellant ink composition having a phase transition temperature; heating the ink composition to a temperature above the phase transition temperature; depositing the ink composition onto a substrate; wherein upon contact with the substrate the ink composition freezes to provide a gel ink layer; treating at least a portion of the gel ink layer whereby treated gellant ink reacts to form a three-dimensional object and wherein untreated gellant ink does not react and remains in gellant form; optionally, wherein the unreacted gellant ink provides a support structure for overhang portions of the three-dimensional object.

Ink Composition.

Any suitable or desired ink can be selected for the process. In embodiments, the inks are curable phase changes inks, desirably radiation curable phase change inks, for example, curable by exposure to ultra-violet radiation. The inks are in a solid or gel state at room temperature or ambient temperature (about 25° C.). To jet the inks, the inks are heated above their melt temperature to change to a liquid or jettable phase. In embodiments, an ultra-violet curable gellant ink is selected wherein the ultra-violet curable gellant ink is an ink that allows easy pigment incorporation and thus enables a wide variety of colors. In further embodiments, an ultra-violet curable gellant ink is selected which ink has the ability to print individual layers of from about 2 micrometers to about 5 millimeters in thickness before curing.

In embodiments, an ultra-violet curable gellant ink suitable for the present process comprises an amide gellant, at least one acrylate monomer, at least one photoinitiator, and at least one colorant, in embodiments wherein the colorant is a pigment. In other embodiments, an ultra-violet curable gellant ink suitable for the present process comprises an amide gellant, at least one acrylate monomer, at least one photoinitiator, and an optional colorant; that is, in embodiments, the ink is free of colorant.

The ink herein can include any suitable or desired gelling agent or gellant. In embodiments, an amide gellant can be selected. The amide gellant can be any suitable or desired amide gellant. The amide gellant includes those disclosed in U.S. Pat. No. 8,142,557, which is hereby incorporated by reference herein in its entirety. The amide gellant may be of the formula

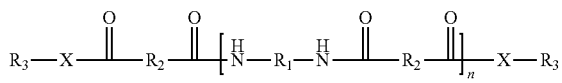

wherein $R_1$ is: (i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 20 carbon atoms in the alkylene chain, such as from 1 to about 12 or from 1 to about 4 carbon atoms, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, about 5 to about 20 carbon atoms in the arylene chain, such as from about 6 to about 14 or from about 6 to about 10 carbon atoms, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from about 7 to about 20 carbon atoms, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ is (i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 54 carbon atoms in the alkylene chain, such as from 1 to about 44 or from 1 to about 36 carbon atoms, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, 5 to about 14 carbon atoms in the arylene chain, such as from 6 to about 14 or from 7 to about 10 carbon atoms, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from 8 to about 20 carbon atoms, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ is (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, X is an oxygen atom or a group of the formula —$NR_4$—, wherein $R_4$ is: (i) a hydrogen atom, (ii) an alkyl group, comprising linear or branched, saturated or unsaturated, cyclic or acyclic, and substituted or unsubstituted alkyl groups, and wherein heteroatoms either may or may not be present in the alkyl group, (iii) an aryl group, comprising substituted or unsubstituted aryl groups, and wherein heteroatoms either may or may not be present in the aryl group, (iv) an arylalkyl group, comprising substituted or unsubstituted arylalkyl groups, wherein the alkyl portion of the arylalkyl group can be linear or branched, saturated or unsaturated, or cyclic or acyclic, or wherein heteroatoms either may or may not be present in either the aryl or the alkyl portion of the arylalkyl group, or (v) an alkylaryl group, comprising substituted and unsubstituted alkylaryl groups, wherein the alkyl portion of the alkylaryl group can be linear or branched, saturated or unsaturated, or cyclic or acyclic, and wherein heteroatoms either may or may not be present in either the aryl or the alkyl portion of the alkylaryl group; and n is from about 1 to about 20, from about 1 to about 15, from about 1 to about 10, or from about 1 to about 5. In one specific embodiment, $R_2$ is the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including, for example, isomers of the formula

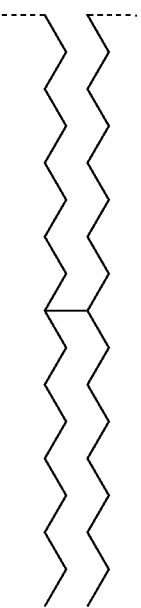

In one specific embodiment, $R_1$ is an ethylene (—$CH_2CH_2$—) group.

In one specific embodiment, $R_3$ is

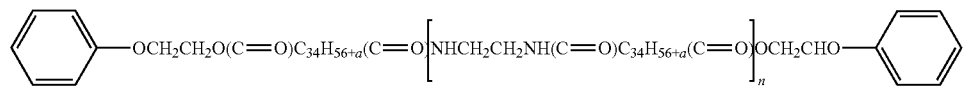

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, and n is 1 to about 20, from about 1 to about 15, from about 1 to about 10, or from about 1 to about 5, including, for example, isomers of the formula

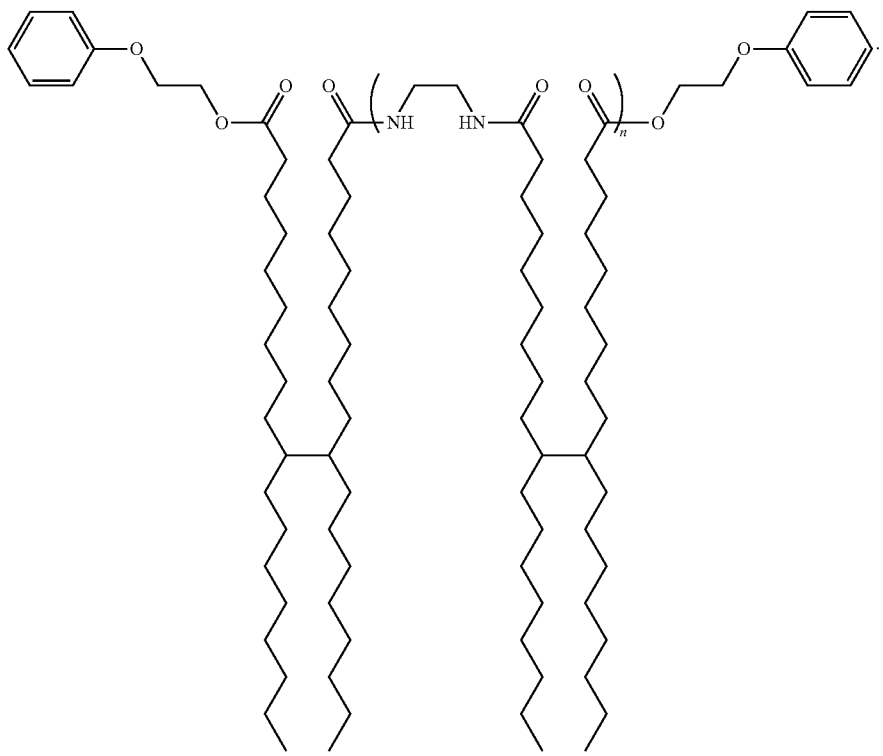

The gellant compounds as disclosed herein can be prepared by any desired or effective method.

For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, which describes a process for preparing a compound of the formula

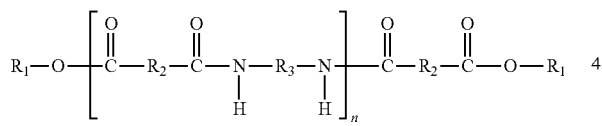

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

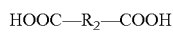

with a diamine of the formula

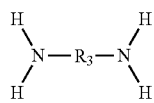

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

In embodiments, the curable gellant ink comprises at least one gellant of the formula

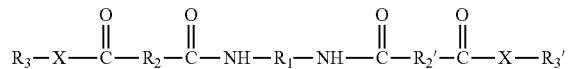

wherein $R_1$ is (i) an alkylene group, (ii) an arylene group, (iii) an arylalkylene group, or (iv) an alkylarylene group, $R_2$ and $R_2'$ each, independently of the other, are (i) alkylene groups, (ii) arylene groups, (iii) arylalkylene groups, or (iv) alkylarylene groups, $R_3$ and $R_3'$ each, independently of the other, are groups which are (i) alkyl groups, (ii) aryl groups, (iii) arylalkyl groups, or (iv) alkylaryl groups, and X and X' each, independently of the other, is an oxygen atom or a group of the formula —$NR_4$—, wherein $R_4$ is (i) a hydrogen atom, (ii) an alkyl group, (iii) an aryl group, (iv) an arylalkyl group or (v) an alkylaryl group.

The gellant, gelling agent, or amide gellant is present in the ink in any desired or effective amount, in embodiments the amide gellant is present in an amount of from about 1 to about 30 percent by weight based upon the total weight of the ink, or from about 2 to about 20 percent by weight based upon the total weight of the ink, or from about 5 to about 12 percent by weight based upon the total weight of the ink.

The ink vehicles disclosed herein can comprise any suitable curable monomer or oligomer. Examples of suitable materials include radically curable monomer compounds, such as acrylate and methacrylate monomer compounds, which are suitable for use as phase change ink carriers.

The ultra-violet curable phase change gellant ink can comprise any suitable or desired acrylate monomer. In embodiments, the ink herein comprises at least one acrylate monomer.

Specific examples of acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures or combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tricyclodecane dimethanol diacrylate (available from Sartomer Co. Inc. as SR833 S®), tris (2-hydroxy ethyl) isocyanurate triacrylate, SR9012® a brand of trifunctional acrylate ester available from Sartomer Co. Inc, amine modified polyether acrylates (available as PO 83 F®, LR 8869®, and/or LR 8889® (all available from BASF Corporation)), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 98 percent by weight of the carrier, and in another embodiment no more than about 75 percent by weight of the carrier, although the amount of diluent can be outside of these ranges.

The ink vehicles contain at least one compound that can exhibit gel-like behavior in that they undergo a relatively sharp increase in viscosity over a relatively narrow temperature range when dissolved in a liquid such as those compounds that behave as curable monomers when exposed to radiation such as ultraviolet light. Two examples of such a curable liquid monomer are propoxylated neopentyl glycol diacrylate and tricyclodecane dimethanol diacrylate (both available as SR9003® and SR833 S®, respectively, from Sartomer Co. Inc.). In one embodiment, some vehicles as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and vehicles that do not undergo changes within these ranges are also included herein.

The curable monomer or oligomer, for example acrylate monomer, is present in the ink in any desired or effective amount, in embodiments the acrylate monomer is present in an amount of from about 20 to about 90 percent by weight based upon the total weight of the ink, or from about 30 to about 80 percent by weight based upon the total weight of the ink, or from about 50 to about 70 percent by weight based upon the total weight of the ink.

In embodiments, the ultra-violet curable phase change gellant ink herein comprises at least one photoinitiator. Examples of photoinitiators used herein include (but are not limited to) benzophenone derivatives, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from BASF, isopropyl thioxanthenones, arylsulphonium salts and aryl iodonium salts and the like, and mixtures and combinations thereof. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as BASF IRGACURE® 819) and other acyl phosphines, 2-methyl-1-(4-methylthio)phenyl-2-(4-morphorlinyl)-1-propanone (available as BASF IRGACURE® 907) and 1-(4-(2-hydroxyethoxy)phenyl)-2-hydroxy-2-methyl-propan-1-one (available as BASF IRGACURE® 2959), 2-benzyl 2-dimethylamino 1-(4-morpholinophenyl) butanone-1 (available as BASF IRGACURE® 369), 2-hydroxy-1-(4-(4-(2-hydroxy-2-methylpropionyl)-benzyl)-phenyl)-2-methylpropan-1-one (available as BASF IRGACURE® 127), 2-dimethylamino-2-(4-methylbenzyl)-1-(4-morpholin-4-ylphenyl)-butanone (available as BASF IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the ink, and in another embodiment at least about 1 percent by weight of the ink, and in one embodiment no more than about 15 percent by weight of the ink, and in another embodiment no more than about 10 percent by weight of the ink, although the amount can be outside of these ranges.

In embodiments, the ultra-violet curable phase change gellant ink herein comprises a colorant. Any desired or effective colorant can be employed, including dyes, pigments, mixtures thereof, and the like, provided that the colorant can be dissolved or dispersed in the ink vehicle. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (Ciba); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Permanent Red P-F7RK; Hostaperm® Violet BL (Clariant); Permanent Rubine L5B 01 (Clairant); LITHOL® Scarlet 4440 (BASF); Bon Red® C (Dominion Color Company); ORACET® Pink RF (BASF); PALIOGEN® Red 3871 K (BASF); SUNFAST® Blue 15:3 and SUNFAST® 15:4 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA PAC® C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue BCA (BASF); PALIOGEN® Blue 6470 (BASF); Sudan Orange G (Aldrich), Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL and NOVOPERM® Yellow P-HG (Clariant); Lumogen® Yellow D0790 (BASF); Suco-Yellow L1250 (BASF); Suco-Yellow D1355 (BASF); Suco Fast Yellow D1 355, D1 351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA® Magenta (DU PONT); PALIOGEN® Black L0084 (BASF); Pigment Black K801 (BASF); and carbon blacks such as REGAL 330™ (Cabot), Carbon Black 5250, Carbon Black 5750 (Columbia Chemical), Mogul® E (Cabot), and the like, as well as mixtures thereof.

In certain embodiments, the ultra-violet curable phase change gellant ink herein comprises at least one pigment. Any suitable or desired pigment can be selected including, but not limited to, the pigments described herein.

The colorant is present in the phase change ink in any desired or effective amount to obtain the desired color or hue, in embodiments from about 0.1 percent to about 15 percent by weight of the ink, or from about 0.2 percent to about 8 percent by weight of the ink, although the amount can be outside of these ranges.

In certain embodiments, the ultra-violet curable phase change gellant ink herein comprises a white colorant, which can be selected from dyes, pigments, mixtures thereof, and the like, provided that the colorant can be dissolved or dispersed in the ink vehicle.

In embodiments herein, the white colorant is a white pigment selected from titanium dioxide, zinc oxide, zinc sulfide, calcium carbonate, clay, lithopone (a mixture of barium sulphate and zinc sulfide), or mixtures or combinations thereof. In a specific embodiment, the white colorant is a titanium dioxide pigment. Commercial grades of $TiO_2$ are designed with additional artifacts to enhance optical properties such as tint strength and undertone and to promote dispersion stability. The pigment features include size, degree of coating with silica and or alumina, as well as optional organic materials. Illustrative examples of suitable titanium oxide pigments include pigments selected from Ti-Pure® R-108, Ti-Pure® R-104, Ti-Pure® R-103, Ti-Pure® R-102, Ti-Pure® R-700, Ti-Pure® R-706, Ti-Pure® R-760, Ti-Pure® R-900, Ti-Pure® R-960, available from DuPont Titanium Technologies, Wilmington, Del., 2020®, 2063®, 2090®, 2310®, 2450® available from Kronos Inc., Cranbury, N.J., and Tiona® 595, Tiona® 568, Tiona® RCL-6, Tiona® RCL-9, and Tiona® 696 available from Millennium Inorganic Chemicals, Hunt Valley, Md.

In embodiments, pigments selected herein can have a volume average particle size (diameter) of from about 150 to about 450 nanometers, or from about 200 to about 300 nanometers. In one embodiment, the white colorant is a titanium dioxide pigment having a particle size of from about 200 to about 300 nanometers.

The white colorant is present in the ink in any desired or effective amount, in embodiments the white colorant is present in an amount of from about 1 to about 60 percent by weight based upon the total weight of the ink, or from about 20 to about 40 percent by weight based upon the total weight of the ink. In one embodiment, the white colorant is a white pigment present in the ink an amount of about 1 to about 60 percent by weight based upon the total weight of the ink, or from about 20 to about 40 percent by weight based upon the total weight of the ink, or about 10 percent by weight based upon the total weight of the ink.

In embodiments, the ultra-violet curable phase change gellant ink comprises a white colorant comprising a white titanium dioxide pigment having a particle size of from about 200 to about 300 nanometers; a colorant dispersant; and an ink vehicle comprising at least one curable monomer, at least one photoinitiator, optionally at least one stabilizer, and optionally at least one wax.

In embodiments, the ultra-violet curable phase change gellant ink comprises an ink set comprising a plurality of differently colored curable phase change inks, wherein each colored ink of the ink set is comprised of an ink vehicle, a gelling agent, a pigment, and a dispersant, wherein the dispersant is identical in each colored ink of the ink set and the dispersant is present in a substantially same amount in each colored ink of the ink set. In embodiments, the ink used in the present process is selected from the inks described in U.S. Pat. No. 8,545,002, which is hereby incorporated by reference herein in its entirety.

In embodiments, the ink herein comprises a base ink set including at least two, and desirably three or four, phase change inks of different colors. A colored ink is an ink that exhibits a perceptible color to a viewer's naked eye, for example as a result of the ink including a colorant that exhibits the perceptible color. Desirably, a base ink set comprises four colored inks representing the CYMK colors. However, a base ink set can also comprise different colors, such as blue, green, red, violet, orange, white, and black. Each colored ink the base ink set is comprises of an ink vehicle, a pigment, and a dispersant. Each ink may utilize a different ink vehicle or may utilize the same ink vehicle. The dispersant of each colored ink of the ink set must be the same dispersant for all the colored inks in the ink set. Also, the amount of dispersant in each colored ink of the ink set desirably is presented in the colored inks in the same amount.

The ink set may also include a pigmentless (colorless) ink that may or may not contain the same dispersant, optionally in the same amount or a different amount (if present), as the colored inks of the base ink set. The pigmentless phase change ink can be used in forming a custom color ink that is a lighter shade in color, by mixing the pigmentless ink with one or more colored inks of the ink set, or may be used in cleaning of an ink jet apparatus.

Using the same pigment dispersant in the same amount across all colored inks of an ink set can eliminate interactions between the dispersants and/or unintended pigment-dispersant interactions when the inks are mixed in forming a custom color.

The radiation curable phase change inks can also, if desired, contain additives to take advantage of the known functionality associated with such additives. Such additives may include, for example, defoamers, slip and leveling agents, pigment dispersants, and the like, as well as mixtures and combinations thereof. The inks can also include additional monomeric or polymeric materials as desired.

Any suitable or desired additives can be selected. In embodiments, dispersants can be random and block copolymers, such as an amino acrylate block copolymer, for example including an amino or amino acrylate block A and an acrylate block B, the acrylate portions permitting the dispersant to be stably and well dispersed in the ink vehicle while the amino portions adsorb well to pigment surfaces. Commercially available examples of block copolymer dispersants include DISPERBYK-2001® (BYK Chemie GmbH) and EFKA® 4340 polymeric pigment dispersant available from BASF Corporation.

In embodiments, a base ink set comprises colored inks that each include the same dispersant or same combination of dispersants, such that there is no difference among the dispersant component in each of the colored inks of the ink set. Each colored ink of the ink set desirably includes the same total amount of the dispersant compared to the other colored inks of the ink set. The dispersant may be added to the ink in any suitable or desired amount, in embodiments at from about 20 to about 200 percent by weight relative to the pigment, such as from about 20 to about 150 percent by weight relative to the pigment, or form about 20 to about 100 percent by weight relative to the pigment.

The pigment and dispersant may be added to the ink as a dispersion of the pigment and dispersant. The pigment dispersion may have a solids percentage of from about 5 to about 50 percent, such as from about 50 to about 40 percent, or from about 10 to about 40 percent.

The radiation curable phase change inks herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® 1-403, and NAUGARD® 959, commercially available from Crompton Corporation, Middlebury, Conn.; IRGANOX® 1010 and IRGASTAB® UV 10, previously commercially available from Ciba Specialty Chemicals; GENORAD® 16 and GENORAD® 40 commercially available from Rahn AG, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

Curing of the ink can be effected by exposure of the ink image to actinic radiation at any desired or effective wavelength, in embodiments from about 200 nanometers to about 480 nanometers, although the wavelength can be outside of this range. Exposure to actinic radiation can be for any desired or effective period of time, in embodiments for about 0.2 second to about 30 seconds, or from about 1 second to 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in embodiments no lower than about 50° C., no lower than about 60° C., no lower than about 70° C., or no higher than about 120° C., or no higher than about 110° C., although the jetting temperature can be outside of these ranges) in embodiments no more than about 30 centipoise, no more than about 20 centipoise, or no more than about 15 centipoise, or no less than about 2 centipoise, no less than about 5 centipoise, or no less than about 7 centipoise, although the melt viscosity can be outside of these ranges.

In embodiments, the ultra-violet curable phase change gellant ink comprises an ink having a viscosity of from about 2 to about 16 centipoise at a temperature of from about 70° C. to about 95° C. and a freezing temperature of from about 30° C. to about 75° C.

The radiation curable phase change inks can also, if desired, contain additives to take advantage of the known functionality associated with such additives. Such additives may include, for example, defoamers, slip and leveling agents, pigment dispersants, and the like, as well as mixtures and combinations thereof. The inks can also include additional monomeric or polymeric materials as desired.

In embodiments, the process comprises exposing the gel ink layer whereby exposed gellant ink reacts to form a three-dimensional object and wherein unexposed gellant ink does not react and remains in gellant form. For example, a mask can be used to shield portions of the gellant ink. Reacting can be induced by any suitable or desire method. In embodiments, reacting comprises exposing to irradiation to effect curing or cross-linking. In embodiments, treating comprises exposing to irradiation, in embodiments, exposing to ultra-violet irradiation. Curing of the ink can be effected by exposure of the ink image to actinic radiation at any desired or effective wavelength, in embodiments from about 200 nanometers to about 480 nanometers, although the wavelength can be outside of this range. Exposure to actinic radiation can be for any desired or effective period of time, in embodiments for about 0.2 second to about 30 seconds, or from about 1 second to 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like. In embodiments, the inks are ultra-violet curable phase change inks.

In embodiments, treating at least a portion of the gel ink layer or at least a portion of the gel layer comprises treating using dynamic light processing. In embodiments, curing is by flash exposure using dynamic light processing or digital light processing (DLP). As described on the World Wide Web at http://3dprintingindustry.com/3 d-printing-basics-free-beginners-guide/processes/, or digital light processing is a similar process to stereolithography in that it is a 3D printing process that works with photopolymers. The major difference is the light source. DLP uses a more conventional light source, such as an arc lamp, with a liquid crystal display panel or a deformable mirror device (DMD), which is applied to the entire surface of the vat of photopolymer resin in a single pass, generally making it faster than stereolithography. For further detail, see http://3dprintingindustry.com/3 d-printing-basics-free-beginners-guide/processes/. As described on the World Wide Web on Wikipedia at https://en.wikipedia.org/wiki/Digital_Light_Processing, DLP technology is light-source agnostic and as such can be used effectively with a variety of light sources. Historically, the main light source used on DLP display systems has been a replaceable high-pressure xenon arc lamp unit (containing a quartz arc tube, reflector, electrical connections, and sometimes a quartz/glass shield), whereas most pico category (ultra-small) DLP projectors use high-power LEDs or lasers as a source of illumination.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are solid or gel at ambient temperature.

Heating the Ink Composition.

In embodiments, heating the ink composition to a temperature above the phase transition temperature comprises heating the ink composition to a temperature of from about 70 to about 120° C., or from about 80 to about 100° C., or from about 85 to about 95° C.

Depositing the Ink Composition.

Depositing the ink composition can comprise any suitable or desired deposition method. The inks herein, as well as the methods herein, may be employed with any desired printing system and marking material suitable for applying a marking material in an imagewise pattern directly to an image receiving recording medium, such as ink jet printing, thermal ink jet printing, piezoelectric ink jet printing, acoustic ink jet printing, and the like.

In embodiments, depositing comprises ink jet printing, fluid coating, spray coating, or a combination thereof. In certain embodiments, depositing comprises fluid coating, spray coating, or a combination thereof. In embodiments, depositing one or more layers of ultra-violet curable phase change ink comprises ink jetting the one or more layers. Each individual layer can be any suitable or desired thickness or print height. In embodiments, each layer of the one or more layers of ultra-violet curable phase change ink is from about 2 micrometers to about 5 millimeters in thickness.

Ink jet print heads can experience issues such as clogging. In embodiments, depositing comprises spray technology which gives more latitude and avoids some of the issues that may present themselves with ink jet printing. In embodiments, depositing is performed using a fluid coater. In other embodiments, depositing is performed using a spray coater.

In embodiments, when multiple layers are successively deposited, the layers can be cured upon completion of deposition of a last of the multiple layers. In another embodiment, each layer can be cured prior to the deposition of a subsequent layer. Thus, in embodiments, curing comprises curing each layer of the one or more layers of ultra-violet curable phase change ink prior to depositing the next layer of ultra-violet curable phase change ink, or curing comprises curing after depositing the last layer of the one or more layers of ultra-violet curable phase change gellant ink.

Substrates.

In embodiments, the process herein comprises depositing the support, scaffold, or mold and depositing the one or more layers of the ultra-violet curable phase change gellant ink comprises depositing by ink jetting. In embodiments, the substrate is the platform on which the three-dimensional object is printed. The support structure is a structure provided for overhang areas of the three-dimensional object.

In embodiments, the curable gellant ink composition, or the curable gellant alone, is used for both the support structure and the final three-dimensional object.

Thus, the process enables depositing a single material that is used for both the support structure and the three-dimensional object.

In certain embodiments, a process herein comprises depositing a gellant or a curable gellant ink composition having a phase transition temperature to form a support or a build; heating the curable gellant or curable gellant ink to a temperature above the phase transition temperature; depositing additional gellant or curable gellant ink onto the formed support or build, wherein, upon contact with the support or build, the gellant or curable gellant ink freezes to provide a gel layer; selectively exposing the gel layer whereby exposed gellant or exposed gellant ink reacts to form a three-dimensional object and wherein unexposed gellant or unexposed gellant ink does not react and remains in gellant form; optionally, wherein the unreacted gellant ink provides a support structure for overhang portions of the three-dimensional object.

Thus, in embodiments, the unreacted gellant ink provides a support structure for overhang portions of the three-dimensional object.

A single curable gellant ink composition can be used to form both the support structure and the three-dimensional object. Thus, in embodiments, a single curable gellant ink forms both the three-dimensional object and the support on which the three-dimensional object is formed. In other embodiments, a single gellant is used to form both the support structure and the three-dimensional object.

In still further embodiments, the support structure can be formed from a gellant and the three-dimensional object can be formed from a curable gellant ink. Thus, in embodiments, the process comprises depositing a curable gellant to form the support structure for overhang portions of the three-dimensional object; and depositing a curable gellant ink to form the three-dimensional object. This embodiment provides the advantage of a support structure that can be deposited in the same manner as the curable gellant ink, but using a simpler composition that does not require all of the components of the curable gellant ink composition while still providing the advantages of a removeable, re-useable gellant that can function as substrate and/or support structure for overhang portions.

In still further embodiments, the support structure can be formed from a curable gellant ink and the three-dimensional object can be formed from a gellant.

As used herein, overhang portion can mean a part of the three-dimensional structure that extends beyond the main part of the three-dimensional object and that prior to curing would deform due to gravity acting on it.

In embodiments, the three-dimensional object has one or more overhang portions and untreated gellant ink provides support for overhang portions of the three-dimensional object. The untreated gellant ink can then be easily removed and re-used after the three-dimensional object is completed.

Freezing.

In embodiments, where it is said that upon contact with the substrate and subsequent cooling below its gel point, the ink composition freezes, it is meant that the ink composition transitions from a fluid to a gel or solid state that does not flow due to gravity. In embodiments, the ultra-violet curable phase change gellant ink comprises an ink having a viscosity of from about 2 to about 16 centipoise at a temperature of from about 70° C. to about 95° C. and a freezing temperature of from about 30° C. to about 75° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

An ultra-violet curable gellant ink having the components as shown in Table 1 was prepared as follows.

TABLE 1

| Component | Weight Percent | m/g |
|---|---|---|
| PPGEL-19 | 7.50 | 15.0 |
| SR833 S | 85.30 | 170.6 |
| Irgacure ® 819 | 2 | 4 |
| Irgastab ® UV 10 | 0.2 | 0.4 |
| Subtotal SR833S | 14.7 | 200 |
| Total | 100 | 200 |

PPGEL-19 is a blend of oligomers or x-mers of an ester-terminated polyamide gellant as disclosed in U.S. Pat. No. 8,882,256, which is hereby incorporated by reference herein in its entirety.

SR833 S is a monomer (tricyclodecane dimethanol diacrylate) available from Sartomer Chemical Corp.

Irgacure® 379 is a photoinitiator, 2-dimethylamino-2-(4-methylbenzyl)-1-(4-morpholin-4-ylphenyl)-butanone, available from BASF Corporation.

Irgacure® 819 is a photoinitiator, bis(2,4,6-trimethylbenzoyl)-phenyl-phosphine oxide, available from BASF Corporation.

Esacure® KP 150 is an oligomeric alpha hydroxyketone photoinitiator, Oligo [2-hydroxy-2-methyl-1-[4-(1-methylvinyl) phenyl] propanone], available from Lamberti.

Irgastab® UV 10 is an in-can nitroxide-based stabilizer previously commercially available from Ciba Specialty Chemicals.

Figure 4:
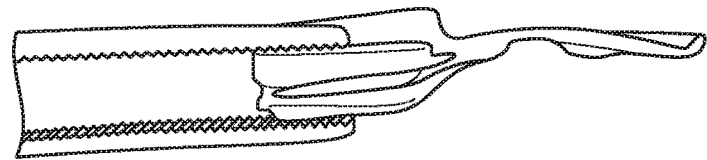
FIG. 4 is an illustration of a three-dimensional object having an overhang portion prepared in accordance with the present disclosure.

The components listed in Table 1 were combined and heated to 90° C. and then poured into a mold with one side covered with a mask. This was cured by exposure to UV light from a UV Fusion LC-6B Benchtop Conveyor equipped with UV Fusion Light Hammer 6 Ultraviolet Lamp System employing a "D" bulb for a minimum of 1 second. Further melted ink was poured into the mold and a different mask was used to create an overhang. After a second UV exposure, the object was placed into an oven at 90° C. to melt the unexposed, masked ink, and the 3D object was lifted off to give the finished structure with the unexposed monomer left behind as shown in FIG. 4.

In embodiments, a method for three-dimensional (3D) printing is provided comprising use of ultra-violet curable (UV) gellant ink compositions. Curable gellant inks, in embodiments, ultra-violet curable gellant inks comprising at least one ultra-violet curable monomer, a gellant, and a photoinitiator, are liquid and jettable (that is, capable of being jetted by ink jet printing) at elevated temperatures, controllable by gel structure, and solid at room temperature. In embodiments, an ultra-violet curable gellant ink is heated above its phase transition temperature and deposited on a build substrate layer by layer, such as by ink jetting or spray coating. The layer cools upon contact with the substrate and solidifies. The layer is then exposed in an imagewise fashion with a UV laser to build the 3D structure. Upon irradiation with UV, the exposed areas cross link to create the build structure while the unexposed areas remain as a gel. The unexposed gel act as a support lattice for the UV treated build regions. Once the build stage is completed, the 3D object is heated above the phase transition temperature to melt away the gel ink and give the desired 3D structure. The excess gel ink can be reused. In embodiments, the UV gel ink can be melted, poured into a mold, and exposed selectively to UV using a mask to create a 3D structure. The process is advantageous over previous processes, such as previous stereolithographic processes, in that the present process does not require a support structure to support overhangs.

Mask.

In embodiments, a mask can be employed to shield one or more portions of the deposited curable gellant ink in order to form the three-dimensional object. In embodiments, a mask is employed to shield portions of the deposited curable gellant ink which masked portions then form the support for overhang portions of the final three-dimensional object.

Any suitable or desired mask can be selected. In embodiments, the mask can be selected from those described in U.S. Pat. No. 9,481,803, which is hereby incorporated by reference herein in its entirety. In embodiments, the mask comprises a water dispersible phase change ink composition comprising a hydrophilic wax having at least one ethoxyl moiety; a low viscosity wax having at least one hydroxyl group, wherein the low viscosity wax is miscible with the hydrophilic wax; an optional stabilizer; and a colorant, wherein the colorant is selected to absorb light in a region that one wants to block. In embodiments, the process herein further comprises disposing a water dispersible phase change ink composition onto a photo-sensitive emulsion film that is disposed on a screen to form a mask; wherein the water dispersible phase change ink composition comprises a hydrophilic wax having at least one ethoxyl moiety; a low viscosity wax having at least one hydroxyl group, wherein the low viscosity wax is miscible with the hydrophilic wax; an optional stabilizer, and a colorant, wherein the colorant is selected to absorb light in a region that one wants to block; exposing the mask to radiation to form a stencil; and washing with water to remove the mask, leaving the photo-imaged stencil.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process comprising:
providing a curable gellant ink composition having a phase transition temperature;
heating the ink composition to a temperature above the phase transition temperature;
depositing the ink composition onto a substrate; wherein upon contact with the substrate the ink composition freezes to provide a gel ink layer;
treating at least a portion of the gel ink layer whereby treated gellant ink reacts to form a three-dimensional object and wherein untreated gellant ink does not react and remains in gellant form forming a support on which the three-dimensional object is formed;
wherein a single curable gellant ink forms both the three-dimensional object and the support on which the three-dimensional object is formed;
optionally, wherein the unreacted gellant ink provides a support structure for overhang portions of the three-dimensional object; and
wherein the untreated gellant ink is re-useable.

2. The process of claim 1, wherein depositing comprises ink jetting, fluid coating, spray coating, or a combination thereof.

3. The process of claim 1, wherein treating comprises using dynamic light processing.

4. The process of claim 1, wherein treating comprises exposing to irradiation.

5. The process of claim 1, wherein treating comprises exposing to ultra-violet irradiation.

6. The process of claim 1, wherein the curable gellant ink comprises an amide gellant, at least one acrylate monomer, at least one photoinitiator, and, optionally, a colorant.

7. The process of claim 1, wherein the curable gellant ink comprises an ink having a viscosity of from about 2 to about 16 centipoise at a temperature of from about 70° C. to about 95° C. and a freezing temperature of from about 30° C. to about 75° C.

8. The process of claim 1, wherein the curable gellant ink comprises at least one gellant of the formula

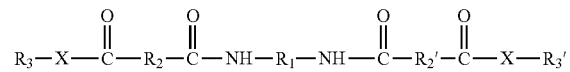

wherein $R_1$ is (i) an alkylene group, (ii) an arylene group, (iii) an arylalkylene group, or (iv) an alkylarylene group, $R_2$ and $R_2'$ each, independently of the other, are (i) alkylene groups, (ii) arylene groups, (iii) arylalkylene groups, or (iv) alkylarylene groups, $R_3$ and $R_3'$ each, independently of the other, are groups which are (i) alkyl groups, (ii) aryl groups, (iii) arylalkyl groups, or (iv) alkylaryl groups, and X and X' each, independently of the other, is an oxygen atom or a group of the formula —$NR_4$—, wherein $R_4$ is (i) a hydrogen atom, (ii) an alkyl group, (iii) an aryl group, (iv) an arylalkyl group or (v) an alkylaryl group.

9. The process of claim 1, wherein the three-dimensional object has one or more overhang portions and wherein untreated gellant ink provides support for overhang portions of the three-dimensional object.

10. The process of claim 1, further comprising:
employing a mask to shield one or more portions of the deposited curable gellant ink.

11. The process of claim 1, further comprising:
employing a mask to shield one or more portions of the deposited curable gellant ink;
wherein the one or more masked portions of the deposited curable gellant ink then form a support for overhang portions of the final three-dimensional object.

12. The process of claim 1, further comprising:
employing a mask to shield one or more portions of the deposited curable gellant ink;
wherein the mask comprises a water dispersible phase change ink composition comprising a hydrophilic wax having at least one ethoxyl moiety; a low viscosity wax having at least one hydroxyl group, wherein the low viscosity wax is miscible with the hydrophilic wax; an optional stabilizer; and a colorant, wherein the colorant is selected to absorb light in a region that one wants to block.

13. A process comprising:
providing a curable gellant ink composition having a phase transition temperature;
heating the ink composition to a temperature above the phase transition temperature;
depositing the ink composition onto a substrate; wherein upon contact with the substrate the ink composition freezes to provide a gel ink layer;
treating at least a portion of the gel ink layer whereby treated gellant ink reacts to form a three-dimensional object and wherein untreated gellant ink does not react and remains in gellant form and wherein the untreated gellant ink is re-useable;

wherein the unreacted gellant ink provides a support structure for overhang portions of the three-dimensional object; and collecting the untreated gellant ink.

14. The process of claim 13, wherein depositing comprises ink jetting, fluid coating, spray coating, or a combination thereof.

15. The process of claim 13, wherein treating comprises using dynamic light processing.

16. The process of claim 13, wherein treating comprises exposing to ultra-violet irradiation.

17. The process of claim 13, wherein the curable gellant ink comprises an amide gellant, at least one acrylate monomer, at least one photoinitiator, and, optionally, a colorant.

18. A process comprising:
providing at least one of a curable gellant ink composition having a phase transition temperature and a curable gellant having a phase transition temperature;

heating to a temperature above the phase transition temperature of the curable gellant ink composition or heating to a temperature above the phase transition temperature of the curable gellant;

depositing one or both the ink composition and the curable gellant onto a substrate; wherein upon contact with the substrate the ink composition, the curable gellant, or both, freeze to provide a gel ink layer, a gellant layer, or both a gel ink layer and a gellant layer;

treating at least a portion of the gel ink layer, at least a portion of the gellant layer, or both, whereby treated gellant ink and treated gellant reacts to form a three-dimensional object and wherein untreated gellant ink and untreated gellant does not react and remains in gellant form and wherein the untreated gellant ink and untreated gellant is re-useable;

wherein the unreacted gellant ink, the unreacted gellant, or both, provide a support structure for overhang portions of the three-dimensional object; and collecting the untreated gellant ink, the untreated gellant, or both.

19. The process of claim 18, comprising depositing a curable gellant to form the support structure for overhang portions of the three-dimensional object; and depositing a curable gellant ink to form the three-dimensional object.

20. The process of claim 18, wherein depositing comprises ink jetting, fluid coating, spray coating, or a combination thereof.

21. The process of claim 18, wherein treating comprises using dynamic light processing.

22. The process of claim 18, wherein the curable gellant ink comprises an amide gellant, at least one acrylate monomer, at least one photoinitiator, and, optionally, a colorant.

* * * * *